US009065556B2

(12) United States Patent
Popescu et al.

(10) Patent No.: US 9,065,556 B2
(45) Date of Patent: Jun. 23, 2015

(54) METHODS, SYSTEMS, AND COMPUTER READABLE MEDIA FOR PROCESSING MULTIPLE CONTROL AND USER DATA FLOWS AT A PORT PROCESSOR

(71) Applicant: Ixia, Calabasas, CA (US)

(72) Inventors: Sorin-Cristian Popescu, Calarasi (RO); Adrian Lucian Bondrescu, Caracal (RO); Cristian Cordos, Bucharest (RO); Adrian Baisan, Constanta (RO)

(73) Assignee: Ixia, Calabasas, CA (US)

( * ) Notice: Subject to any disclaimer, the term of this patent is extended or adjusted under 35 U.S.C. 154(b) by 175 days.

(21) Appl. No.: 13/716,077

(22) Filed: Dec. 14, 2012

(65) Prior Publication Data
US 2014/0169177 A1  Jun. 19, 2014

(30) Foreign Application Priority Data

Dec. 14, 2012 (RO) ............................... A2012-01010

(51) Int. Cl.
*H04B 17/00* (2006.01)
*H04W 24/06* (2009.01)
(52) U.S. Cl.
CPC ............... *H04B 17/00* (2013.01); *H04W 24/06* (2013.01)
(58) Field of Classification Search
CPC ............................... H04W 24/00; H04B 17/00
USPC ........... 370/241, 250, 252; 702/108; 713/201; 714/2, 724
See application file for complete search history.

(56) References Cited

U.S. PATENT DOCUMENTS

| 5,850,386 | A | 12/1998 | Anderson et al. |
| 6,996,772 | B2 | 2/2006 | Justice et al. |
| 7,543,054 | B1 | 6/2009 | Bansod et al. |
| 7,765,313 | B2 | 7/2010 | Jain et al. |
| 8,010,469 | B2 | 8/2011 | Kapoor et al. |
| 8,135,657 | B2 | 3/2012 | Kapoor et al. |
| 8,601,585 | B2 | 12/2013 | Beddoe et al. |
| 2005/0022012 | A1* | 1/2005 | Bluestone et al. ............ 713/201 |
| 2006/0242499 | A1* | 10/2006 | Volz .............................. 714/724 |
| 2011/0238855 | A1 | 9/2011 | Korsunsky et al. |
| 2012/0144226 | A1* | 6/2012 | Yang et al. ........................ 714/2 |
| 2012/0240185 | A1 | 9/2012 | Kapoor et al. |
| 2013/0006567 | A1* | 1/2013 | Horn ............................. 702/108 |
| 2013/0060735 | A1 | 3/2013 | Haddy et al. |
| 2013/0208600 | A1* | 8/2013 | Campbell et al. ............. 370/241 |
| 2013/0227092 | A1 | 8/2013 | Maestas |

(Continued)

OTHER PUBLICATIONS

Non-Final Office Action for U.S. Appl. No. 13/718,813 (Jan. 14, 2015).

(Continued)

*Primary Examiner* — Brian D Nguyen
*Assistant Examiner* — Toan Nguyen
(74) *Attorney, Agent, or Firm* — Jenkins, Wilson, Taylor & Hunt, P.A.

(57) ABSTRACT

Methods, systems, and computer readable media for processing multiple control and user data flows at a port processor are disclosed. According to one method, the method occurs at a testing platform. The method includes concurrently receiving, via a communications interface of the testing platform, a first control plane flow and a second control plane flow. The method also includes concurrently processing the first control plane flow and the second control plane flow using a port processor of the testing platform.

25 Claims, 6 Drawing Sheets

(56) References Cited

U.S. PATENT DOCUMENTS

2013/0275606 A1 10/2013 Iyer
2014/0173094 A1 6/2014 Majumdar et al.

OTHER PUBLICATIONS

Final Office Action for U.S. Appl. No. 13/447,160 (Dec. 19, 2014).
Dutta et al., "A Tight Lower Bound for Parity in Noisy Communcations Networks," Tata Institute of Fundamental Research, pp. 1056-1065 (2008).
Non-Final Office Action for U.S. Appl. No. 13/447,160 (Jul. 10, 2014).
Advisory Action for U.S. Appl. No. 13/447,160 (May 29, 2014).
Applicant-Initiated Interview Summary for U.S. Appl. No. 13/447,160 (May 23, 2014).
Final Office Action for U.S. Appl. No. 13/447,160 (Mar. 18, 2014).
Interview Summary for U.S. Appl. No. 13/447,160 (Feb. 25, 2014).
Non-Final Office Action for U.S. Appl. No. 13/447,160 (Nov. 8, 2013).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0.(Sep. 2011).
Abbes et al., "Protocol Analysis in Intrusion Detection Using Decision Tree," IEEE, Proceedings of the International Conference on Information Technology: Coding and Computing (ITCC'04), pp. 1-5 (2004).
Sleator et al., "Self-Adjusting Binary Search Trees," Journal of the Association for Computing Machinery. vol. 32, No. 3, pp. 652-686 (Jul. 1985).

* cited by examiner

| Network Ranges By Port Distribution Group | Activities & Endpoints | |
|---|---|---|
| Range Name | ActivityGroup1 | ActivityGroup2 |
| [−] [eNB S1-u -2] DistGroup1: Consecutive IPs | | |
| Network Range UE-R1 in Network1 | ☑ | ☐ |
| Network Range UE-R2 in Network1 | ☐ | ☑ |

FIG. 3

METHODS, SYSTEMS, AND COMPUTER READABLE MEDIA FOR PROCESSING MULTIPLE CONTROL AND USER DATA FLOWS AT A PORT PROCESSOR

PRIORITY CLAIM

This application claims the benefit of Romanian Patent Application No. A2012-01010, filed Dec. 14, 2012; the disclosure of which is incorporated herein by reference in its entirety.

TECHNICAL FIELD

The subject matter described herein relates to testing communications networks. More specifically, the subject matter relates to methods, systems, and computer readable media for processing multiple control and user data flows at a port processor.

BACKGROUND

In communications networks, such as LTE networks, network components are often tested using devices that generate test packets, send the packets to a device under test, receive responsive packets from the device under test, and generate statistics indicative of the performance of the device under test. For example, in LTE networks, it may be desirable to test the functionality of a serving gateway (SGW) by sending streams of test packets to the SGW. In some tests, the streams of test packets mimic the traffic that would be received by such a node if the node were operating in a live network. In other tests, the goal is to send streams of packets that test the extremes of the operational capabilities or stress test the device under test.

In some test environments, specialized radio equipment may be required to receive and transmit data between a testing platform and a device under test. For example, a port processor (e.g., a port central processing unit (port CPU)) of a testing platform may receive or transmit LTE data via attached specialized radio equipment (e.g., a radio head). To simulate complex scenarios involving numerous users and/or flows (e.g., multiple sessions of control plane traffic and/or user plane traffic), conventional testing platforms require multiple port CPUs and a similar amount of specialized radio equipment. However, requiring multiple port CPUs and radio heads increase complexity and costs for the test operator. Further, by requiring more equipment, conventional testing platforms can hinder or delay testing of networks and/or network equipment.

Accordingly, in light of these difficulties, a need exists for improved methods, systems, and computer readable media for processing multiple control and user data flows at a port processor.

SUMMARY

Methods, systems, and computer readable media for processing multiple control and user data flows at a port processor are disclosed. According to one method, the method occurs at a testing platform. The method includes concurrently receiving, via a communications interface of the testing platform, a first control plane flow and a second control plane flow. The method also includes concurrently processing the first control plane flow and the second control plane flow using a port processor of the testing platform.

A system for processing multiple control and user data flows at a port processor is also disclosed. The system includes a testing platform. The testing platform includes a communications interface configured to receive a first control plane flow and a second control plane flow. The testing platform also includes a port processor configured to concurrently process the first control plane flow and the second control plane flow.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 3 is a diagram illustrating an exemplary user interface for configuring associations between network ranges and activity groups according to an embodiment of the subject matter described herein;

DETAILED DESCRIPTION

The subject matter described herein discloses methods, systems, and computer readable media for processing multiple control and user data flows at a port processor. When testing networks and/or network equipment, it may be desirable to test the response of the network and other equipment under non-trivial load conditions.

Conventional testing platforms are configured such that a single port processor handles a single control plane flow (e.g., a tunneling session) and related user data flows (e.g., HTTP connections) for each network range (e.g., a group of simulated subscribers or user equipment (UE)). Moreover, conventional testing platforms are configured such that specialized radio equipment is needed for each port processor. Advantageously, aspects of the subject matter described herein can be used to minimize the amount of resources required to concurrently process multiple control plane flows and related user data flows associated with a network range by using activity groups. Activity groups are logical constructs used by a port processor and/or a related network stack to concurrently process multiple control plane flows and user data flows related to the control plane flows.

Figure 1:
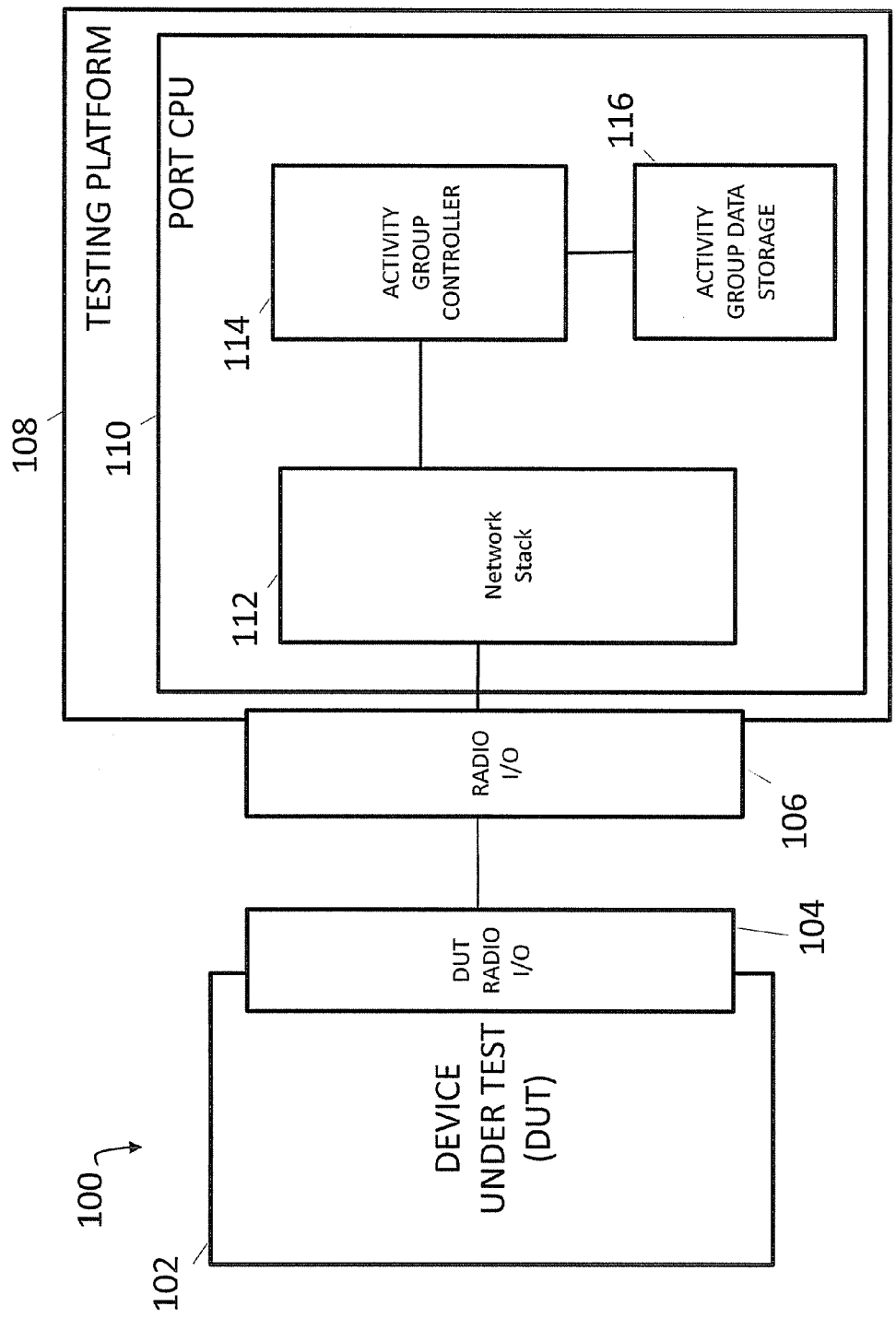
FIG. 1 is a diagram illustrating an exemplary network for processing multiple control and user data flows at a port processor according to an embodiment of the subject matter described herein.

FIG. 1 is a diagram illustrating an exemplary network 100 for processing multiple control and user data flows at a port processor according to an embodiment of the subject matter described herein. Network 100 may include a device under test (DUT) 102, a testing platform 108, and radio input/output (I/O) modules or radio heads 104 and 106. DUT 102 may represent any suitable entity (e.g., a serving gateway, a packet data network gateway, a base transceiver station (BTS), node B, eNode B, a WiMAX base station, etc.) for providing data via an air (e.g., wireless) or wire interface. For example, DUT 102 may be a serving gateway that provides data via a tunneling protocol.

In some embodiments, tunnel encapsulated packets may be transmitted using a modulation and/or coding scheme, such as LTE or LTE advanced technology. In such embodiments, specialized radio equipment, known also as radio heads, may be used to transmit and receive the data.

Radio head 104 may represent any suitable entity for controlling and/or performing radio I/O functions; e.g., sending communications from DUT 102 or receiving communications destined for DUT 102. In some embodiments, radio head 104 may be distinct from or integrated with DUT 102. Radio head 104 may perform analog-to-digital and/or digital-to-analog conversion. Radio head 104 may also include operation and management processing capabilities and a standardized optical interface to connect to one or more components. Radio head 104 may communicate using various communications protocols. For example, radio head 104 may be connected to DUT 102 via one or more fiber optic cable using a common public radio interface (CPRI) protocol or may be connected via another interface or using other protocols. Data transmitted over a CPRI link may consist of digitized samples of the analog baseband signal, plus a low bandwidth control channel. Data carried over the CPRI link may be a continuous stream of numbers, representing the digitized samples of a baseband waveform.

Radio head 106 may be associated with testing platform 108 and may include functionality similar to radio head 104. For example, radio head 106 represent any suitable entity for controlling and/or performing radio I/O functions; e.g., sending communications from testing platform 108 or receiving communications destined for testing platform 108. In some embodiments, radio head 106 may be distinct from or integrated with testing platform 108.

In some embodiments, communications between DUT 102 and testing platform 108 may or may not traverse radio head 104 and/or radio head 106. For example, DUT 102 may be a serving gateway or other EPC node that transmits data via a wired interface and/or a digital protocol, such as eGTP encapsulated real-time protocol (RTP) or (IP) packets. In this example, radio head 106 may convert transmitted data into a CPRI protocol for reception by testing platform 108. In another example, communications between DUT 102 and testing platform 108 may not traverse any radio heads.

Testing platform 108 may be any suitable entity (e.g., a stand-alone node or distributed multi-node system) configured to perform one or more aspects associated with testing DUT 102. In some embodiments, testing platform 108 may be a stand-alone tool, a testing device, or software executing on a processor. In some embodiments, testing platform 108 may be a single node or may be distributed across multiple computing platforms or nodes.

In some embodiments, testing platform 108 may be integrated or co-located with a multiple UE simulator (multi-UE simulator). The multi-UE simulator may include functionality for simulating one or more LTE UEs, sending communications to DUT 102, receiving communications from DUT 102, and/or testing communications capabilities of DUT 102. For example, testing platform 108 may be configured to generate control plane commands that triggers DUT 102 to establish one or more tunnels for numerous simulated UEs to communicate with a packet data network, such as the Internet.

In some embodiments, testing platform 108 may simulate one or more evolved packet core (EPC) nodes. For example, testing platform 108 may be an LTE mobile network entity having functionality similar to that of a radio network controller (RNC) and a base station (BS) in 2G networks or an RNC and a Node B in 3G mobile networks. In some embodiments, testing platform 108 may be responsible for header compression, ciphering, reliable delivery of packets, admission control, and radio resource management.

Testing platform 108 may include a port processor 110. Port processor 110 may be any suitable entity (e.g., an ASIC, a FPGA, or software executing on a processor) for receiving data, transmitting data, and/or processing data. For example, port processor 110 may receive data from or transmit data to DUT 102 via a physical port or connection. In some embodiments, port processor 110 may include functionality for communicating with radio head 106 via CPRI or other protocols. For example, a CPRI interface and/or link may provide data from radio head 106 to port processor 110 and vice versa.

Port processor 110 may include a network stack 112, an activity group controller 114, and activity group data storage 116. Network stack 112 may represent any suitable entity (e.g., software executing on a processor) for receiving, transmitting, and/or processing control plane data and/or user plane data. In some embodiments, network stack 112 may include or access a physical port or connection. The physical port may receive data from radio head 106 or another entity. Network stack 112 may include functionality for converting or transforming data between various protocols and/or layers (e.g., Internet protocol suite layers).

Activity group controller 114 may be any suitable entity for configuring and/or implementing activity groups. An activity group may be logical entity for allowing multiple control plane flows (e.g., eGTP control plane flows) and/or user data flows to be processed concurrently using minimal resources, such as a single network stack 112 or port processor 110. In contrast to the subject matter described herein, a conventional testing platform may limit a network stack to a single control flow. As such, a conventional testing platform may require multiple port processors and additional radio equipment to handle multiple evolved GPRS tunneling protocol (eGTP) sessions or flows (e.g., one or more related packets) involving a same group of subscribers, i.e., a network range of one or more UEs.

In some embodiments, an activity group and/or activities (e.g., flows) therein may occur concurrently (e.g., run in parallel) and/or may be independent (e.g., may not interfere or be aware of other activity groups or activities). For example, activity group 'X' may include an eGTP tunneling session involving an FTP file transfer and activity group 'Y' may include a different eGTP tunneling session involving an IMAP email server connection. In this example, messages associated with both activity groups may be processed by port processor 106 without the activity groups having any knowledge of and/or access to messages associated with the other activity groups.

Activity group controller 114 may include a mapping mechanism for associating a network range (e.g., a group of simulated subscribers) and one or more activity groups. By associating an activity group to a network range, different control plane and user plane behavior may be defined within the network range. For example, a network range, such as a group of simulated UEs, may be associated with two or more control plane flows and/or user data flows. When communications are received, the flows may be identified and processed by port processor 110.

Activity group controller 114 may include functionality for configuring different test objectives for each activity group. For example, an activity group may have an objective of reaching a certain number of subscribers performing one or more activities, such as requesting a video from a popular website. In another example, a number of concurrent sessions may be an objective for an activity. In some embodiments, each activity group may have one or more objective types (e.g., a mixed objective) and multiple objective values.

Activity group controller 114 may include functionality for configuring timelines for each activity group. For example, an activity group may have a timeline for coordinating when a certain activity is to occur. In some embodiments, a timeline may include a particular time for an activity (e.g., a communication) is to be sent, received, or processed. In some embodiments, a timeline may include a relative order in which activities are to occur. For example, a timeline may indicate that an http client connection may be established prior to an FTP file transfer during a particular activity group.

Activity group controller 114 may include functionality for generating and providing user interfaces. User interfaces may be used for modifying activity groups and related configuration information. Additional information regarding user interfaces and configuration information will be discussed with reference to FIGS. 2-5.

Activity group data storage 116 may include any suitable entity (e.g., a non-transitory computer readable medium) for storing data associated with activity groups, including timeline information, objective types, objectives, and associated network ranges. Activity group data storage 116 may be accessible to network stack 112, activity group controller 114, and/or other entities. In some embodiments, activity group data storage 116 may be integrated with port processor 110 or located externally to port processor 110.

It will also be appreciated that the above described modules are for illustrative purposes and that features or portions of features described herein may be performed by different and/or additional modules, components, or nodes.

Figure 2:
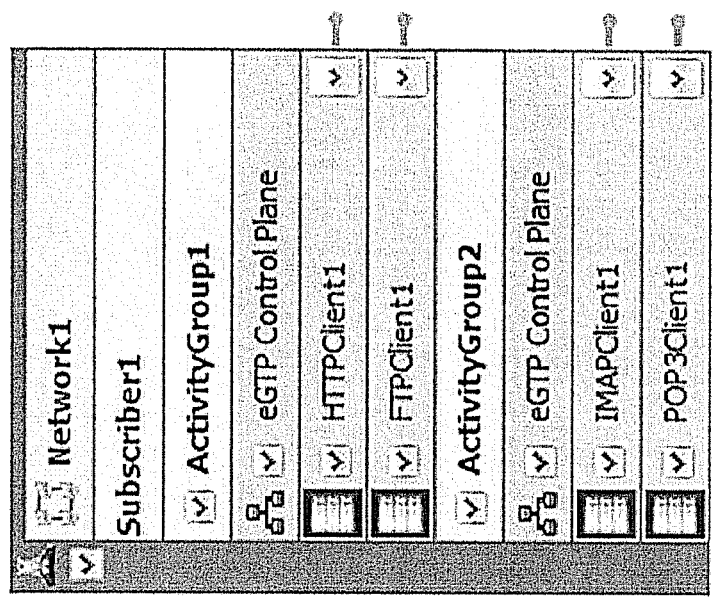
FIG. 2 is a diagram illustrating an exemplary user interface for displaying activities of activity groups according to an embodiment of the subject matter described herein.

FIG. 2 is a diagram illustrating an exemplary user interface (UI) 200 for displaying activities of activity groups according to an embodiment of the subject matter described herein. In some embodiments, UI 200 may be generated and provided by activity group controller 114 and/or another node or module.

In FIG. 2, UI 200 may include a hierarchal structure of UI elements. Each UI element may be interactive and usable for configuring one or more test components. UI 200 may include a network element 'Network1.' 'Network1' element may be indicative of a particular network range, such as one or more subscribers or UEs. UI 200 may be usable to select and configure various options associated with a network range, including adding or subtracting subscribers, modifying an access point name (APN), or other network-related settings.

UI 200 may also include a subscriber element 'Subscriber1.' 'Subscriber1' element may be indicative of a particular simulated subscriber or UE. UI 200 may be usable to select and configure various options associated with a subscriber or UE, including adding or subtracting features, modifying an internal mobile subscriber identity (IMSI), or other phone-related settings.

UI 200 may also include activity group elements, 'ActivityGroup1' and an 'ActivityGroup2.' 'ActivityGroup1' element and 'ActivityGroup2' element may each be indicative of a particular activity group. User interface 200 may be usable to select and configure various options associated with an activity group, including adding or subtracting activities or flows, modifying objectives and/or timelines, or other activity group-related settings.

In some embodiments, each activity group may be associated with a control plane flow and zero or more layer 4-7 flows. For example, 'ActivityGroup1' includes an eGTP control plane flow and two application layer flows, an HTTP client flow and an FTP client flow. In another example, 'ActivityGroup2' includes an eGTP control plane flow and two application layer flows, an IMAP client flow and a POP client flow.

FIG. 3 is a diagram illustrating an exemplary UI 300 for configuring associations between network ranges and activity groups according to an embodiment of the subject matter described herein. In some embodiments, UI 300 may be generated and provided by activity group controller 114 and/or another node or module.

In FIG. 3, UI 300 may include UI elements (e.g., check boxes) for associating activity groups and network ranges. Using UI 300, one or more activity groups can be associated with a network range. For example, network range 'Network Range UE-R1 in Network1' may be associated with activity group 'ActivityGroup1' and network range 'Network Range UE-R2 in Network1' may be associated with activity group 'ActivityGroup2.'

In some embodiments, activity groups may be associated with more than one network ranges. For example, network range 'Network Range UE-R1 in Network1' and network range 'Network Range UE-R2 in Network1' may be associated with activity group 'ActivityGroup1.' In this example, during testing, activities for both network ranges may be received, transmitted, and/or processed using port processor 110, network stack 112, and/or radio head 106.

Figure 4:
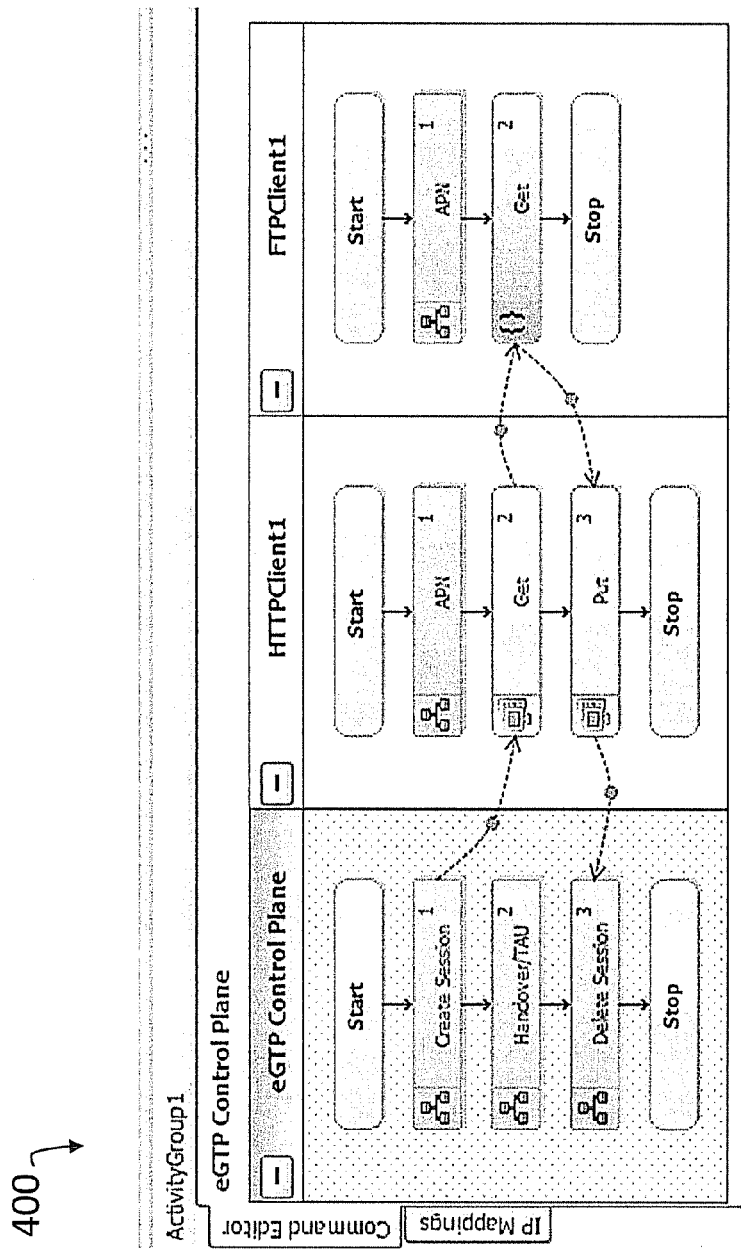
FIG. 4 is a diagram illustrating an exemplary user interface for configuring commands associated with an activity group according to an embodiment of the subject matter described herein.

FIG. 4 is a diagram illustrating an exemplary UI 400 for configuring commands associated with an activity group according to an embodiment of the subject matter described herein. In some embodiments, UI 400 may be generated and provided by activity group controller 114 and/or another node or module.

In FIG. 4, UI 400 may include a command editor for configuring one or more commands associated with an activity group. UI 400 may display a control plane flow and one or more user data flows or activities. The control plane flow may include an eGTP session. The eGTP session may include a create session command, a handover or tracking area update (TAU) command, and a delete session command. For example, the create session command may be used to establish a tunnel between testing platform 108 and DUT 102. The handover command may be used to change an endpoint associated with the session or otherwise modify the session. The delete session command may be used to tear down or end the tunnel.

UI 400 may display user data flows or activities. One user data flow may include an HTTP client session. The HTTP client session may include an access point name (APN) command, a get command, and a put command. For example, the APN command may be used to identify DUT 102 or another entity for accessing the Internet or a private data network. The get command may be used to retrieve data from a specified resource, e.g., a file stored at an Internet server. The upload command may provide the resource from the specified resource. Another user data flow may include an FTP client session. The FTP client session may include an APN command and a get command. For example, the APN command may be used to identify DUT 102 or another entity for accessing the Internet or a private data network. The get command may be used to retrieve data from an FTP server, e.g., a video stored at a FTP server.

In some embodiments, UI 400 may be usable for indicating linked or associated commands, communications, or portions of flows. Such associations may be modifiable and may be indicative of an expected sequence of events. For example, using UI 400, user-created arrows may link a sequence of commands including a create session command, an HTTP get command, an FTP get command, an HTTP put command, and a delete session command.

Figure 5:
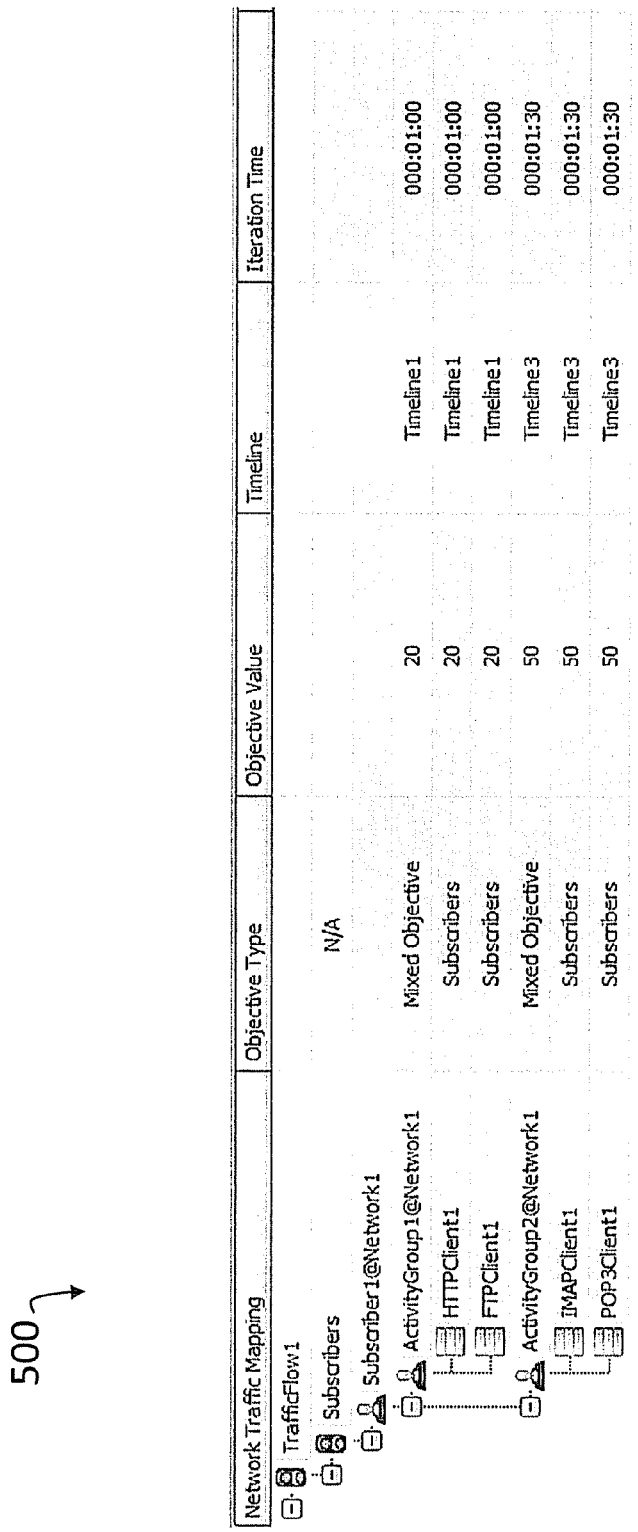
FIG. 5 is a diagram illustrating an exemplary user interface for configuring objective and timeline information associated with activity groups according to an embodiment of the subject matter described herein.

FIG. 5 is a diagram illustrating an exemplary UI 500 for configuring objective and timeline information associated with activity groups according to an embodiment of the subject matter described herein. In some embodiments, UI 500 may be generated and provided by activity group controller 114 and/or another node or module.

In FIG. 5, UI 500 provides UI elements for display and configuring objective types, objective values, timelines, and iterations times associated with activity groups and/or activities therein. Objective types may indicate a goal or objective associated with an activity group or flow therein. Exemplary objective types may include subscriber, sessions, and mixed objectives. For example, a subscriber objective may be related to having a certain number of subscribers from a network range performing an activity during a testing period. In another example, a session objective may be related to having a certain number of concurrent sessions from a network range during a testing period. In yet another example, a mixed objective may have two or more objectives.

Objective values may be configured for testing one or more objectives. In some embodiments, objective values may be triggers for initiating or stopping activities or flows. Exemplary objective values may vary in form and substance, e.g., based on related objective types. For example, a subscriber objective and a session objective may be associated with a threshold number or amount. In another example, a utilization objective may be associated with a threshold percentage. In yet another example, a mixed objective may include multiple values.

Timelines may be configured for coordinating activity groups and/or activities therein. In some embodiments, timelines may be used to indicate a sequence in which activity groups or activities therein are to occur. For example, a timeline 'Timeline1' may be used to indicate that an activity of an activity group occurs relative to other activities in the activity group or at a certain time.

In some embodiments, a timeline editor may be displayed when selecting a timeline cell in UI 500. The timeline editor may be used for specifying when an activity occurs on a particular timeline. For example, the timeline editor may be used to schedule activities at certain times or relative to certain events, activities, or other triggers.

Iteration times may be configured for activity groups and/or activities therein. An iteration time may indicate an amount of time in which an activity group or activity should occur. For example, an iteration time of one minute may be set for one activity group and an iteration time of one minute and thirty seconds may be set for another activity group. In some embodiments, if an iteration time is reached and a flow or activity is not completed, the flow or activity may be canceled, stopped, or progress may be reported to a test operator.

Figure 6:
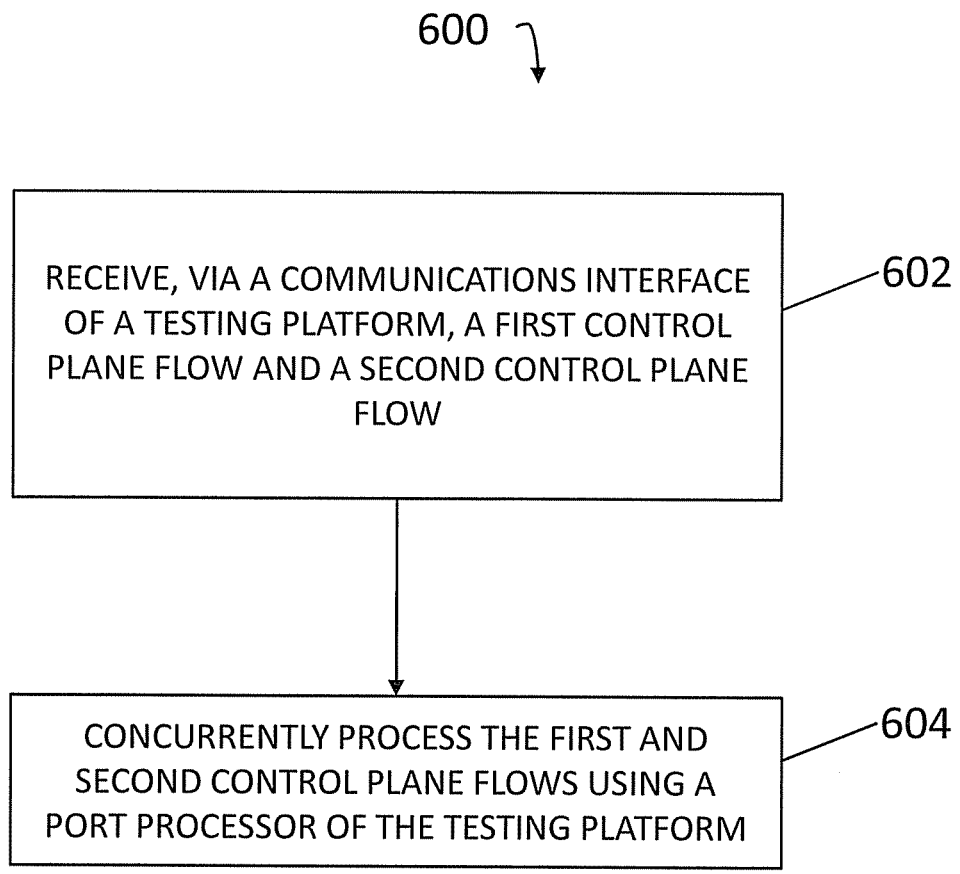
FIG. 6 is a diagram illustrating an exemplary process for processing multiple control and user data flows at a port processor according to an embodiment of the subject matter described herein.

FIG. 6 is a diagram illustrating an exemplary process for processing multiple control and user data flows at port processor 110 according to an embodiment of the subject matter described herein. In some embodiments, exemplary process 600, or portions thereof, may be performed by or at testing platform 108, network stack 112, a multi-UE simulator, radio head 104, radio head 106, port processor 110, activity group controller 114, and/or another node or module.

At step 602, a first control plane flow and a second control plane flow may be received via a communication interface of a testing platform. For example, the first message and the second message may be received concurrently (e.g., about the same time) and may be associated with different flows (e.g., eGTP sessions).

In some embodiments, the first control plane flow may be associated with a first activity group and the second control plane flow may be associated with a second activity group. For example, port processor 110 may receive multiple messages from radio head 106 and/or DUT 102. The messages may be associated with one or more simulated UEs and may be associated with multiple activity groups.

In some embodiments, prior to receiving the first control plane flow and the second plane flow, the first activity group may be associated with a first group of user devices and the second activity group may be associated with a second group of user devices.

In some embodiments, prior to receiving the first control plane flow and the second plane flow, the first activity group and the second activity group may be associated with a group of user devices.

In some embodiments, a group of user devices may include a simulated user device, a simulated LTE device, an LTE user device, a WiMAX user device, a mobile device, a tablet computer, simulated user equipment, or user equipment.

In some embodiments, the first control plane flow may include messages for setting up, modifying, or tearing down a first tunneling protocol session and the second control plane flow may include messages for setting up, modifying, or tearing down a second tunneling protocol session.

In some embodiments, at least one of the first and second flows may traverse an EPC network node, a serving gateway, a packet data network gateway, an evolved Node B, a Node B, a WiMAX base station, an EPC network, or a BTS.

In some embodiments, the communications interface may be a CPRI interface, a radio interface, a wired interface, a wireless interface, or a fiber interface.

In some embodiments, flows associated with the first activity group or the second activity group may be coordinated by a timeline, an objective, or relative to each other.

In some embodiments, the first activity group or the second activity group may include a user data flow. For example, the user data flow may include a transport layer communication, a session layer communication, a presentation layer communication, an application layer communication, a HTTP communication, a FTP communication, an IMAP communication, or a POP communication.

At step 604, the first and second control plane flows may be concurrently processed by port processor 110. For example, after receiving messages associated with different activity groups, port processor 110 and/or network stack 112 may use activity group data from storage 116 when processing the messages to identify the activity groups with which the messages are associated. In this example, each message may be handled independently (e.g., with regard to messages associated with other control plane flows and/or activity groups) by port processor 110. It should be noted that processing flows "concurrently" as used herein means that one flow is processed by the same port processor while another flow is still active and capable of being processed by the port processor. "Concurrently" is not intended to be limited to two operations being performed at the same time by the port processor, although the subject matter described herein is not intended to exclude the port processor performing simultaneous operations. For example, simultaneous operations could be performed by the port processor if the port processor includes more than one processing core.

In some embodiments, concurrently processing the first control plane flow and the second control plane flow using the port processor includes using a network stack configured to process messages associated with multiple activity groups.

In some embodiments, concurrently processing the first control plane flow and the second control plane flow may include processing the first flow while the second flow is active and capable of being processed by the port processor.

In some embodiments, concurrently processing the first control plane flow and the second control plane flow may include using stored data associated with the first and second activity groups to identify the activity group with which messages in the first and second control plane flows are associated and independently processing messages associated with different activity groups using the stored activity group data.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for processing multiple control and user data flows at a port processor, the method comprising:
at a testing platform:
receiving, via a communications interface of the testing platform, a first control plane flow and a second control plane flow; and
concurrently processing the first and second control plane flows using a port processor of the testing platform, wherein the first control plane flow is associated with a first activity group and the second control plane flow is associated with a second activity group, wherein the first activity group includes activities using a first tunneling protocol session and the second activity group includes activities using a second tunneling protocol session, and wherein concurrently processing the first and second control plane flows using the port processor includes sharing, between the first and second control plane flows, a network stack configured to process messages associated with multiple activity groups.

2. The method of claim 1 comprising:
prior to receiving the first and second control plane flows, associating the first activity group with a first group of user devices and associating the second activity group with a second group of user devices.

3. The method of claim 1 comprising:
prior to receiving the first and second control plane flows, associating the first activity group with a group of user devices and associating the second activity group with the group of user devices.

4. The method of claim 3 wherein the group of user devices includes a simulated user device, a simulated LTE device, an LTE user device, a WiMAX user device, a mobile device, a tablet computer, simulated user equipment, or user equipment.

5. The method of claim 1 wherein the communications interface is a CPRI interface, a radio interface, a wired interface, a wireless interface, or a fiber interface.

6. The method of claim 1 wherein flows associated with the first activity group or the second activity group are coordinated by a timeline, an objective, or relative to each other.

7. The method of claim 1 wherein at least one of the first activity group and the second activity group includes a user data flow.

8. The method of claim 7 wherein the user data flow includes a transport layer communication, a session layer communication, a presentation layer communication, an application layer communication, a hypertext transfer protocol (HTTP) communication, a file transfer protocol (FTP) communication, an Internet message access protocol (IMAP) communication, or a post office protocol (POP) communication.

9. The method of claim 1 wherein the first control plane flow includes messages for setting up, modifying, or tearing down the first tunneling protocol session and the second control plane flow includes messages for setting up, controlling, or tearing down the second tunneling protocol session.

10. The method of claim 1 wherein at least one of the first and second flows traverses an evolved packet core (EPC) network node, a serving gateway, a packet data network gateway, an evolved Node B, a Node B, a WiMAX base station, an EPC network, or a base transceiver station (BTS).

11. The method of claim 1 wherein concurrently processing the first and second flows includes processing the first flow while the second flow is active and capable of being processed by the port processor.

12. The method of claim 1 wherein concurrently processing the first and second flows includes using stored data associated with the first and second activity groups to identify the activity group with which messages in the first and second control plane flows are associated and independently processing messages associated with different activity groups using the stored activity group data.

13. A system for processing multiple control and user data flows at a port processor, the system comprising:
a testing platform comprising:
a communications interface configured to receive a first control plane flow and a second control plane flow; and
a port processor configured to concurrently process the first and second control plane flows, wherein the first control plane flow is associated with a first activity group and the second control plane flow is associated with a second activity group, wherein the first activity group includes activities using a first tunneling protocol session and the second activity group includes activities using a second tunneling protocol session, and wherein the port processor is configured to share, between the first and second control plane flows, a network stack for processing messages associated with multiple activity groups.

14. The system of claim 13 wherein the port processor is configured to, prior to receiving the first and second control plane flows, associate the first activity group with a first group of user devices and associate the second activity group with a second group of user devices.

15. The system of claim 13 wherein the port processor is configured to, prior to receiving the first and second control plane flows, associate the first activity group with a group of user devices and associate the second activity group with the group of user devices.

16. The system of claim 15 wherein the group of user devices includes a simulated user device, a simulated LTE device, an LTE user device, a WiMAX user device, a mobile device, a tablet computer, simulated user equipment, or user equipment.

17. The system of claim 13 wherein the communications interface comprises a common public radio interface (CPRI) interface, a radio interface, a wired interface, a wireless interface, or a fiber interface.

18. The system of claim 13 wherein flows associated with the first activity group or the second activity group are coordinated by a timeline, an objective, or relative to each other.

19. The system of claim 13 wherein at least one of the first activity group and the second activity group includes a user data flow.

20. The system of claim 19 wherein the user data flow includes a transport layer communication, a session layer communication, a presentation layer communication, an application layer communication, a hypertext transfer protocol (HTTP) communication, a file transfer protocol (FTP) communication, an Internet message access protocol (IMAP) communication, or a post office protocol (POP) communication.

21. The system of claim 13 wherein the first control plane flow includes messages for setting up, modifying, or tearing down the first tunneling protocol session and the second control plane flow includes messages for setting up, modifying, or tearing down the second tunneling protocol session.

22. The system of claim 13 wherein at least one of the first and second flows traverses an evolved packet core (EPC) network node, a serving gateway, a packet data network gateway, an evolved Node B, a Node B, a WiMAX base station, an EPC network, or a base transceiver station (BTS).

23. The system of claim 13 wherein concurrently processing the first and second flows includes processing the first flow while the second flow is active and capable of being processed by the port processor.

24. The system of claim 13 wherein concurrently processing the first and second flows includes using stored data associated with the first and second activity groups to identify the activity group with which messages in the first and second control plane flows are associated and independently processing messages associated with different activity groups using the stored activity group data.

25. A non-transitory computer readable medium comprising computer executable instructions embodied in a computer readable medium that when executed by a processor of a computer control the computer to perform steps comprising:
at a testing platform:
receiving, via a communications interface of the testing platform, a first control plane flow and a second control plane flow; and
concurrently processing the first and second control plane flows using a port processor of the testing platform, wherein the first control plane flow is associated with a first activity group and the second control plane flow is associated with a second activity group, wherein the first activity group includes activities using a first tunneling protocol session and the second activity group includes activities using a second tunneling protocol session, and wherein concurrently processing the first and second control plane flows using the port processor includes sharing, between the first and second control plane flows, a network stack configured to process messages associated with multiple activity groups.

\* \* \* \* \*